Oct. 13, 1959    J. F. NAYLOR ET AL    2,908,235
BAKERS' AND THE LIKE OVENS
Filed Jan. 31, 1955    6 Sheets-Sheet 1

Joseph Francis Naylor
John Eaton

Inventors

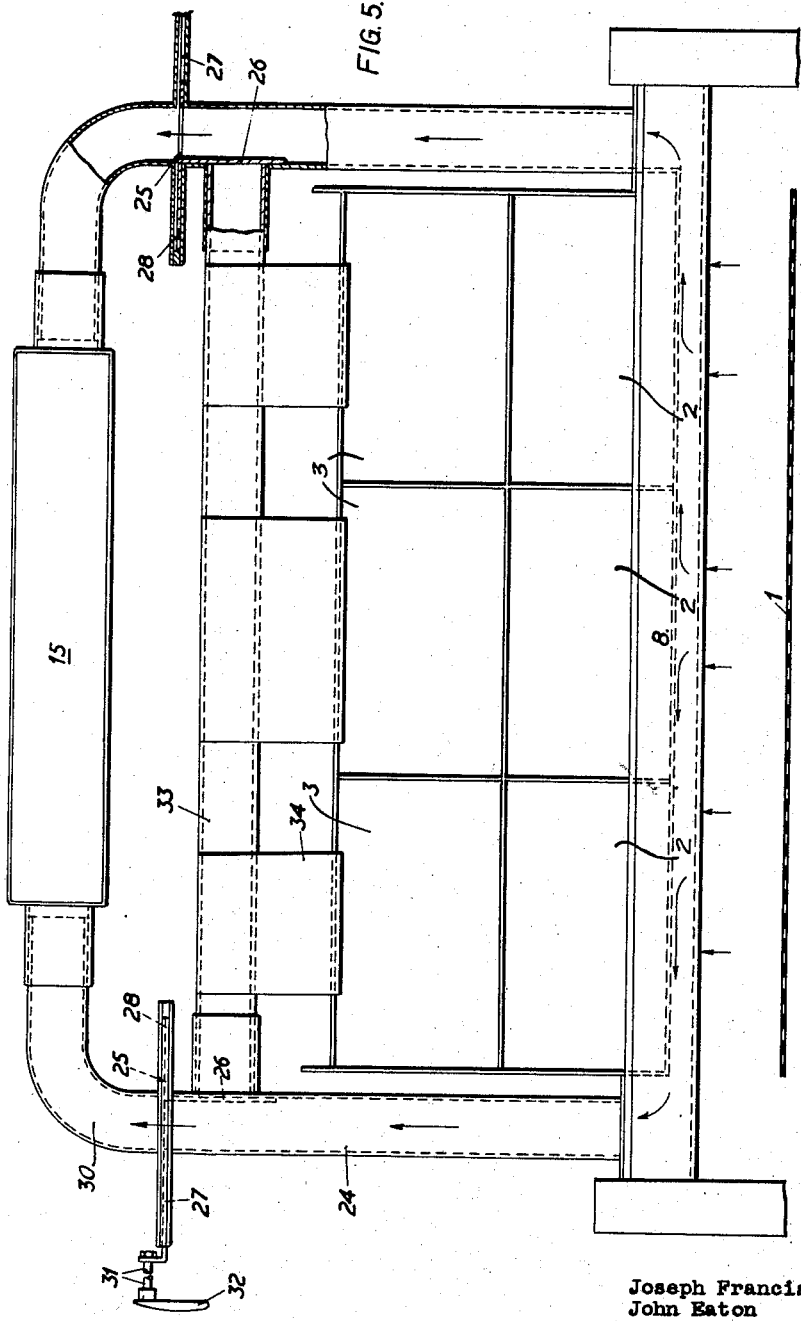

Oct. 13, 1959  J. F. NAYLOR ET AL  2,908,235
BAKERS' AND THE LIKE OVENS
Filed Jan. 31, 1955  6 Sheets-Sheet 4
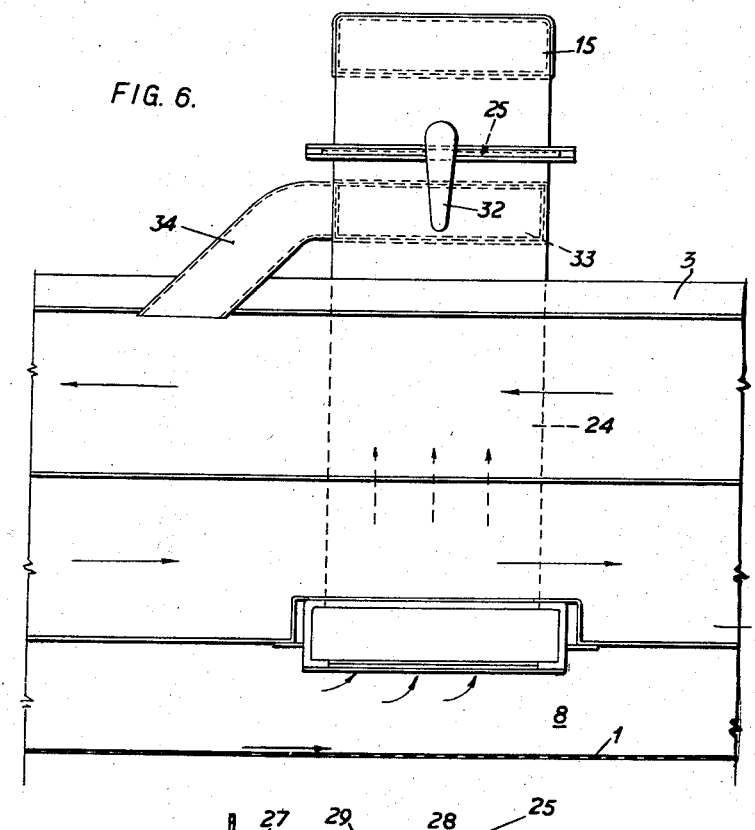
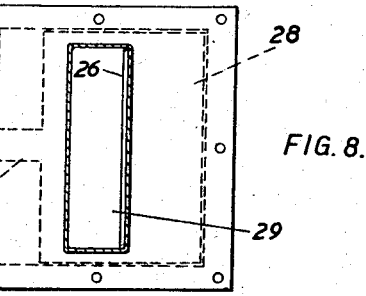
Joseph Francis Naylor
John Eaton
Inventors
By
Attorney

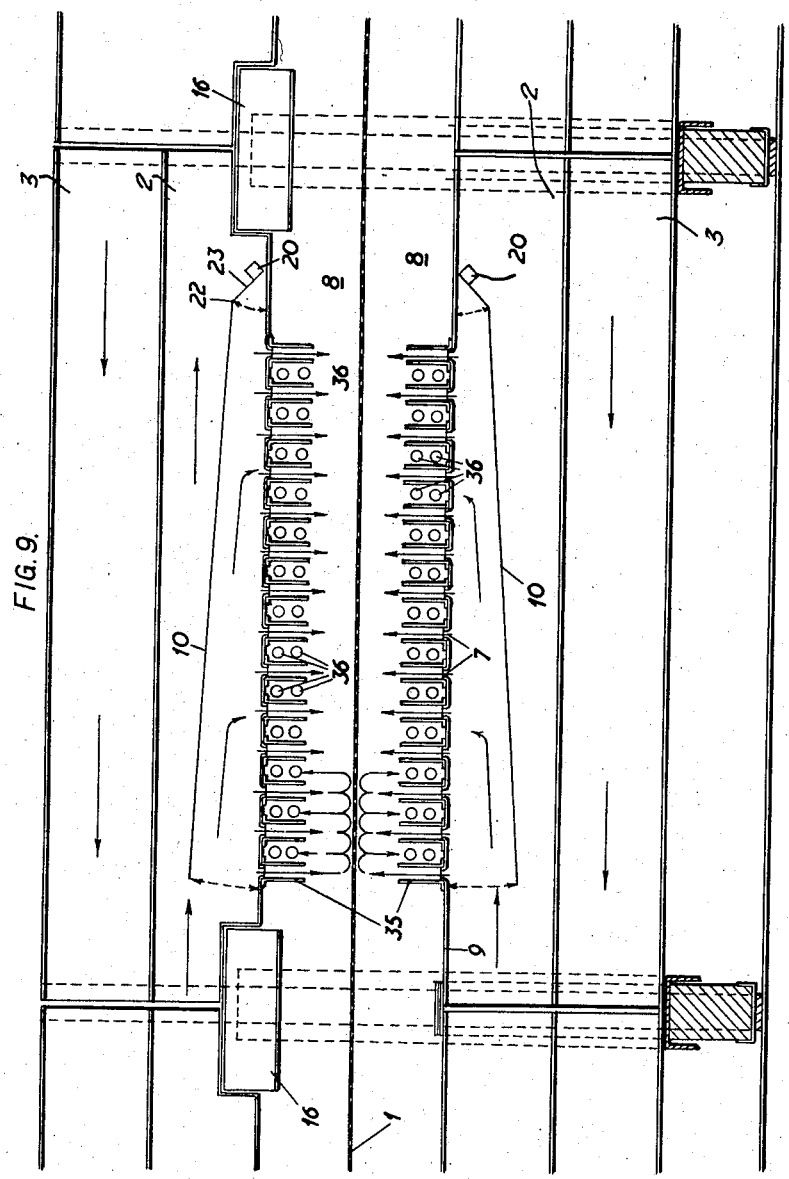

Oct. 13, 1959 J. F. NAYLOR ET AL 2,908,235
BAKERS' AND THE LIKE OVENS
Filed Jan. 31, 1955 6 Sheets-Sheet 6
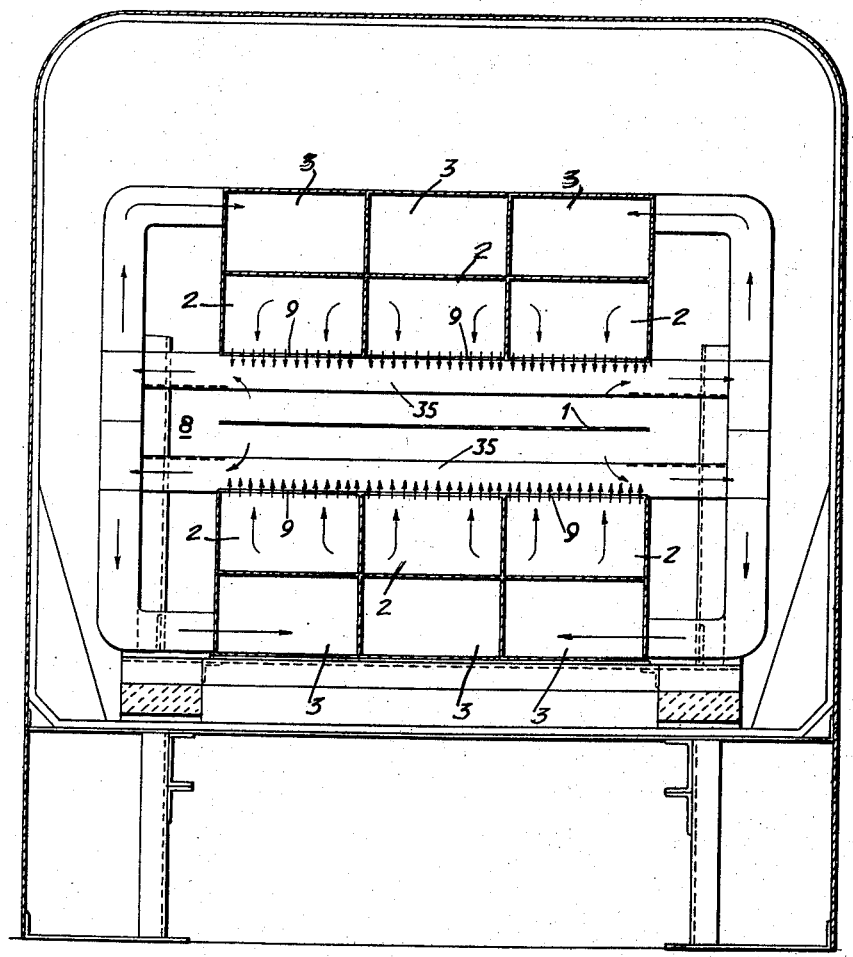
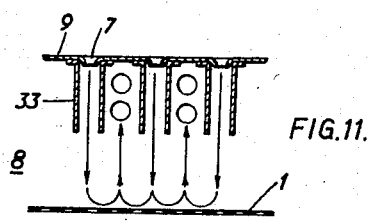
Joseph Francis Naylor
John Eaton
Inventors United States Patent Office 2,908,235
Patented Oct. 13, 1959

2,908,235
BAKERS' AND THE LIKE OVENS

Joseph Francis Naylor and John Eaton, Earlestown, Newton-le-Willows, England, assignors to T. & T. Vicars Limited, Earlestown, Newton-le-Willows, England, a British company Application January 31, 1955, Serial No. 485,121

Claims priority, application Great Britain February 3, 1954

3 Claims. (Cl. 107—63)

The present invention relates to bakers' and the like ovens, and has for its primary object the provision of simple yet efficient means for selectively controlling the flow of a gaseous heating medium in the baking or other heat treatment of edible or other products located within, or passing through, a heat treatment chamber, whereby the gaseous medium either is confined to one or more radiator conduits or ducts, which form one or more boundaries of the heat treatment chamber, for the indirect heating of the products in said chamber, or is caused to come into direct contact with said products.

According to the present invention a dividing wall between the heat treatment chamber and a radiator duct or conduit is perforated over one or more predetermined areas extending longitudinally and transversely of the oven, while the or each group of perforations is controlled by a deflector plate or the like member the position of which determines whether the flow of the gaseous medium is confined to the duct or conduit externally of the baking or heat treatment chamber or passes through the perforations into said chamber.

Thus where it is desired that, at a particular zone of the oven, the heat treatment shall be solely by radiation the groups of perforations in that zone are shrouded by their respective deflectors, but where it is desired that the gaseous heating medium shall come into direct contact with the edible or other products in said zone the deflectors are displaced out of shrouding engagement with the perforations.

Where the normal flow of gaseous medium is longitudinally of ducts or conduits which are perforated on their boundary, common to the baking chamber, that is to say the flow is across or at right angles to the perforations, the deflectors preferably are located within the ducts and may be angularly displaced from a position in which they close the perforations of the plates to a position at which they intersect the path of flow of the gaseous stream and collectively deflect the whole of the stream into the heat chamber.

Conveniently where each duct or conduit extending over an oven zone has three or more spaced groups of perforations enabling the gaseous heating medium to enter the heat treatment chamber over a corresponding number of areas spaced longitudinally of the zone the plates are adapted to be displaced by progressively increased amounts across the path of flow of the gaseous medium with the last plate preferably completely blocking said path whereby when entry of the gaseous medium into the treatment chamber is desired, this is effected in a substantially uniform manner both relatively between the longitudinally spaced groups of perforations and relatively between the perforations of each group.

Instead of causing the baking medium to travel longitudinally through the heat treatment chamber when it is desired to apply the gaseous heating medium directly against the products, the medium on entering the chamber through the perforations may be directed positively on to the products by means of transverse and vertically disposed plates located in front and in rear of each transverse line of perforations, while after contact with the products the medium may be withdrawn from the chamber through ports in the side walls of the chamber located between each adjacent pair of plates.

The invention is more particularly described with reference to the accompanying drawings which show several forms of construction of bakers' ovens particularly suitable for the baking of biscuits by way of example, and in which:

Figure 4 is a detail showing a modified form of the deflector utilized in the oven of Figure 1.

Figure 5 is a transverse sectional view of a modified form of oven by which steam or oven atmosphere, under the control of a damper, may be withdrawn from the baking chamber of the oven and reintroduced into the return flow to the oven of gaseous heating medium, in contradistinction to exhausting said oven atmosphere to waste as in the construction illustrated in Figures 1 and 2.

Figure 6 is a corresponding fragmentary side view of Figure 5.

Figures 7 and 8 illustrate a section and a plan view respectively of the control damper of Figures 5 and 6.

Figure 9 is a diagrammatic sectional view longitudinally through a zone of a modified form of oven wherein the gaeous heating medium entering the heating chamber is caused to leave said chamber through the sides thereof at substantially the same longitudinal part of the oven zone at which it entered the chamber.

Figure 10 is a corresponding transverse sectional view of the oven of Figure 9.

Figure 11 is a detail showing the formation of the perforations in a dividing wall between a radiator duct or conduit and the heat treatment chamber.

Figure 1:
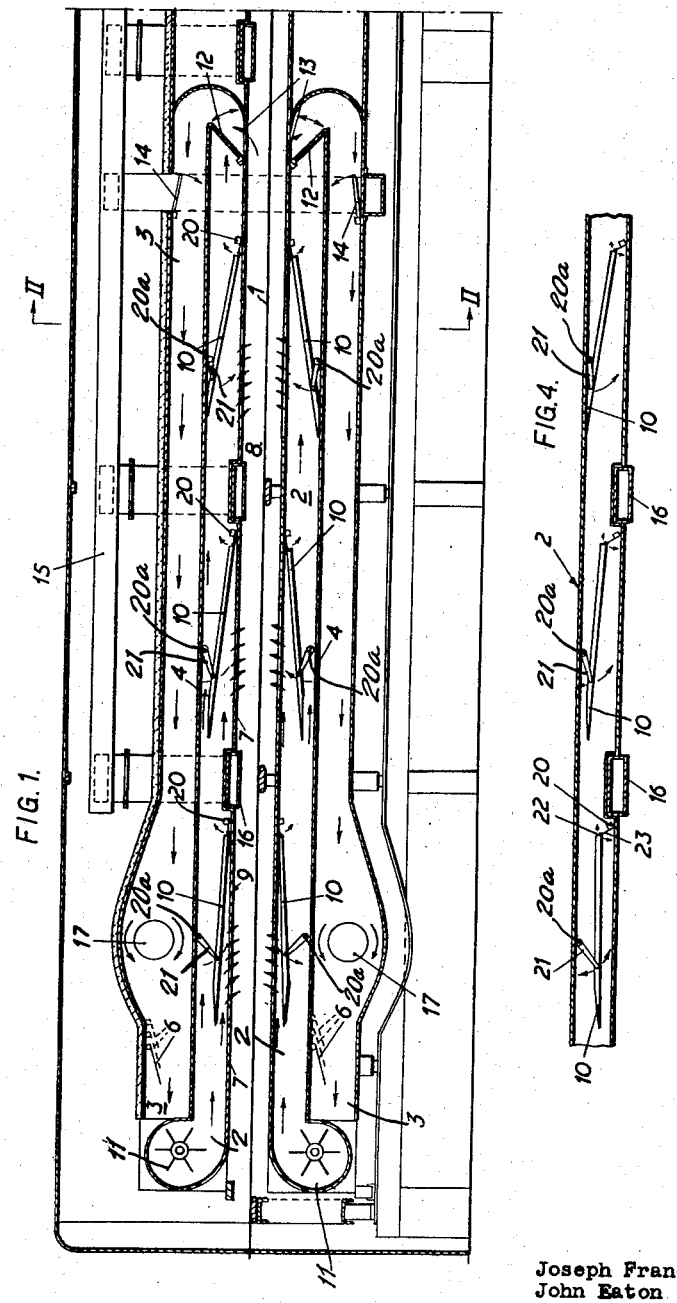
Figure 1 is a diagrammatic sectional view longitudinally through a zone of one form of bakers' oven wherein the gaseous heating medium flows in one direction only along alternative paths according to whether direct or indirect heating of the products in said zone is desired.

In order to avoid repetition in the drawings these are restricted to illustrations of a single zone of a multiple zone oven, that is to say to a part of an oven the heating of which is effected by a complete circuit of a gaseous heating medium.

Each zone of the oven has upper and lower radiator ducts or conduits 2 and upper and lower supply ducts 3 each extending substantially over the entire length of the zone. The latter serve for the supply of gaseous heating medium both above and below the products to be baked which are caused to travel through a heat treatment chamber 8 of the zone on a moving conveyor belt or band 1 in well known manner.

Conveniently the radiator conduits or ducts 2 are separated from supply ducts 3 by means of partitions 4 extending longitudinally of the ducts. In effect these supply ducts constitute return ducts for the gaseous heating medium to the radiator conduits, the heating medium entering a radiator duct from a return duct when at one end of a zone of the oven.

Vertical longitudinal division walls 5 are also provided in the ducts 2, 3, so that the gaseous baking medium may flow along them in a plurality of streams. The volume of the baking medium forming each stream is controlled by one of a number of pivotal dampers 6 which is located in that stream in rear of a burner 17 for heating the stream. Angular displacement of a damper 6 about its pivot, therefore, varies the amount of the baking medium flowing in that particular stream controlled by it, and this in turn varies the baking effect of the stream, and achieves transverse baking balance of the oven as a whole. The dampers 6 are located side by side across the width of the ducts 3 of the oven.

A fan unit 11 is provided for imparting movement to the baking medium through a supply duct 3 and a radiator duct 2, each stream preferably having its own fan located at the end of the duct 3. Thus for example where the width of the oven is taken up by three radiator ducts 2 placed side by side to provide, with their respective supply ducts 3, three separate streams for applying top heat to the products within an oven zone while a similar number of streams are utilised for bottom heat in that zone, the zone may be provided with two fan units 11 each consisting of three fans placed side by side across the ducts 2 of the oven.

A large number of perforations 7 are provided in groups in plates 9 and constitute a substantial part of the area of dividing walls or partitions between the heat treatment chamber 8, through which the conveyor 1 passes, and the radiator ducts or conduits 2. Each group of perforations 7 is controlled by a pivotal deflector plate 10, the position of which determines whether the flow of gaseous medium is confined to the ducts or conduits 2 externally of the chamber 8 so as to heat the products therein indirectly by radiation from the dividing partitions between said ducts 2 and the chamber, or passes through the groups of perforations 7 in the plates 9 to enter the chamber 8 and directly heat the products on the conveyor 1.

Thus where it is desired that, at a particular zone of the oven, the heat treatment shall be solely by radiation the groups of perforations 7 in that zone are shrouded by their respective deflectors 10, but where it is desired that the gaseous heating medium shall come into direct contact with the edible or other products in said zone the deflectors 10 are displaced out of shrouding engagement with the perforations 7.

Where as illustrated the normal flow of gaseous medium is longitudinally of ducts or conduits 2 which are perforated on their boundary, common to the baking chamber, that is to say the flow is across or at right angles to the perforations, the deflectors 10 are located within the ducts 2 and are angularly displaced from a position in which they close the perforations 7 of the plates 9 to a position at which they intersect the path of flow of the gaseous stream and collectively deflect the whole of the stream into the heat chamber 8.

As illustrated where each duct or conduit 2 extending over an oven zone has three or more spaced groups of perforations 7 enabling the gaseous heating medium to enter the heat treatment chamber 8 over a corresponding number of areas spaced longitudinally of the zone the plates 10 are adapted to be displaced by progressively increased amounts across the path of flow of the gaseous medium with the last plate 10 preferably completely blocking said path whereby when entry of the gaseous medium into the treatment chamber 8 is desired, this is effected in a substantially uniform manner both relatively between the longitudinally spaced groups of perforations 7 and relatively between the perforations 7 of each group.

In the construction shown in Figure 1 each deflector plate is mounted upon a shaft 20 for angular displacement therewith under the control of a pivotal arm 21 on a shaft 20a extending laterally of the oven and manually angularly adjustable from a position externally of the oven. The deflector plates of Figure 4 however have two parts, the main part 10 being hinged at 22 to a smaller arm 23 which is mounted on the shaft 20. In this case both the shaft 20a of the pivot arm 21 and the shaft 20 project laterally of the oven to positions externally of said oven where they are separately angularly displaceable manually. It will be seen that the deflector plates are inclined at a smaller angle for a predetermined degree of opening in this form of construction than in that of Figure 1.

Adjustable dampers 12 are provided preferably at the exit end of each oven zone to control the re-circulation of the baking medium. Accordingly these dampers operate to seal the connections between the baking or other heat treatment chamber 8 and the return sections 3 of the ducts comprising openings 13 in plates 9, when the gaseous heating medium does not enter the chamber 8, or when angularly adjusted they allow the oven atmosphere to enter the return sections 3 of the ducts when baking or other heat treatment is convectively influenced.

In the return section of each oven zone is situated a spill damper 14 which deflects a portion of the stream to a spill duct 15, the source of heat 17, and the volume control damper 6 for the baking medium, and as seen from the drawings this control damper 6 is situated between the heat source 17 and the inlet to the fan 11.

When baking or heating is convectively influenced, i.e. the gaseous medium is caused to enter the treatment chamber 8, the amount of heating medium spilled will equal the sum of the products of combustion of the heat source, i.e. the burner 17, and the gaseous products of baking in the chamber 8. When, however, the baking or heating medium does not enter the chamber, i.e. it is confined to the ducts 2 and the dampers 12 cut off the chamber 8 from the return sections 3, the amount spilled will equal the products of combustion of the heat source 17 alone, while the gaseous products of baking are under the control of the dampers 16 located in the baking chamber 8, that is to say are spilled through the dampers 16 leading to ducts 24 and thence to the spill duct 15.

Figure 2:
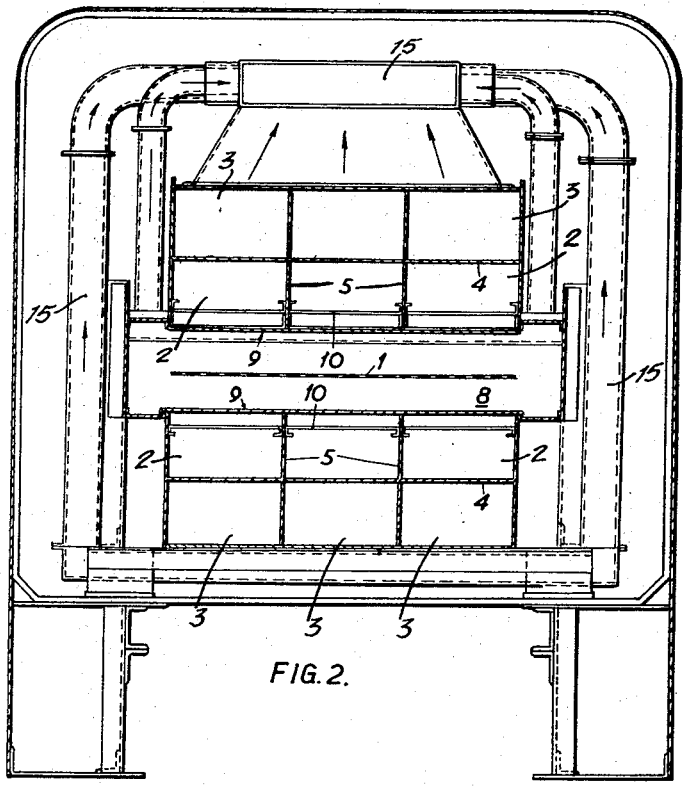
Figure 2 is a corresponding transverse section on the line II—II of Figure 1.
Figure 3:
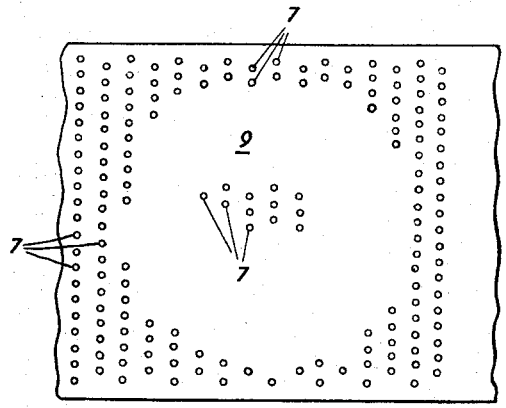
Figure 3 is a detail showing a group of perforations in a bounding wall of the supply duct which are adapted to be controlled by a deflector for enabling the gaseous heating medium to leave the duct and enter the baking chamber.

In the construction according to Figures 1 and 2 the ducts 24 lead solely to the spill ducts 15 which in turn lead to an extractor fan (not shown) and to waste. On the other hand, however, as shown in Figures 5–8, the oven atmosphere withdrawn into the ducts 24 under the control of the dampers 16, may then take either of two directions of flow under the control of further dampers 25 viz. to waste, or into the return supply ducts 3.

For this purpose each damper 25 is located in a duct 24 and comprises a leg 26 extending longitudinally of the duct and a pair of horizontal arms 27, 28 which extend laterally of the duct. The arm 27 has a rectangular orifice 29 formed in it the area and shape of which conforms with the area and shape both of the duct 24 and a duct 30 leading to the atmosphere surrounding the oven, i.e. to waste.

The damper 25 is connected by link means 31 with a handle 32 located externally of the oven, a pull on the handle causing the damper to be displaced towards the left from the position shown in Figure 5, where it shrouds a duct 33 leading through an elbow 34 to a return or supply duct 3 and permits a through flow of oven atmosphere from a duct 24 into a duct 30 and thus to the spill duct 15 and waste, to that position in which the leg 26 lies against the left hand side wall of the duct 24 in which position the arm 28 shuts off the duct 15 from the duct 24 whereby oven atmosphere passing up the duct 24 flows solely into the duct 33, the elbow 34 and thence into a return or supply duct 3.

In a convenient form of construction for use with a multi-zone oven each zone or a part of each zone may comprise a pair of preformed duct units respectively adapted for location above and below a conveyor band or belt for the products to be baked. Each unit may thus comprise an outer shell divided both horizontally and vertically, the flow and return ducts 2, 3 the former of which have perforated areas 9 in one of their walls, the deflector plates 10, the angularly adjustable plates 12 for controlling circulation of flow of the heating medium, the spill dampers 14, oven atmosphere dampers 16 and the transverse baking balancing dampers 6, the heat source 17 and the fans 11. It will be appreciated that any unit may be reversed for connection with adjacent units in order to reverse the direction of flow of heating medium through an oven zone or again any unit may be inverted so as to be utilised in providing top or bottom heat to the products in the oven. No claim however is made for this as it is recognised that no invention is involved in such reversal or inversion.

As shown in Figures 9–11 the gaseous heating medium entering the heat treatment chamber 8 through the perforations 7 is directed positively on to the biscuits or other products on the conveyor belt or band 1 by means of transverse and vertically disposed plates 35 located in front and in rear of each transverse line of perforations 7. After contact with the products on the conveyor belt 1 the gaseous heating medium or oven atmosphere is withdrawn from the zonal heat treatment chamber 8 through ports 36 in the side walls of the chamber, these ports similarly being provided between adjacent pairs of plates 35. As in the case of the ducts 15 of Figs. 1 and 2, the ports 36 may exhaust to the atmosphere outside of the oven, or may communicate with ducts by which the heating medium is recirculated. As may be seen from the drawings the plates extend vertically over substantially half the distance between the perforations 7 and the conveyor belt 1 both below and above the latter.

It will be appreciated that the plates 35 not only improve the impingement effect by reducing the jet spread longitudinally of the chamber 8, but they also assist in exhausting the baking medium and the products of baking from the chamber 8. Thus in effect the longitudinal travel of the gaseous heating medium through the zonal chamber 8 may be restricted to a short distance which is equal or approximately equal to the spacing of successive transverse lines of the perforations 7.

It will also be appreciated that a number of the vertically disposed plates 35 may be eliminated as desired, that is to say the plates may be provided at intervals represented by every second, third or fourth row of perforations for example, instead of between each row as shown in the drawings.

What we claim is:

1. A baker's oven comprising a horizontal baking chamber through which the products to be baked are passed, a plurality of radiator ducts each receiving a flow of gaseous heating medium and having a wall defining a boundary between said baking chamber at one side of said wall and the radiator duct at the other side of said wall, each wall having groups of perforations therein which are spaced apart both longitudinally and transversely thereof, said groups of perforations, taken together, representing a substantial portion of the horizontal area of said wall, and a deflector plate for each of said groups of perforations disposed within the related radiator duct and movable between a first position, where the deflector plate closes the related group of perforations to confine the flow of gaseous heating medium to the radiator duct so that products passed through said baking chamber are baked indirectly by heat radiated from the medium, and a second position, where the deflector plate extends across the flow of gaseous heating medium in the related radiator duct and uncovers the related group of perforations to permit the flow of gaseous heating medium to pass therethrough from the radiator duct into said baking chamber so that products in the latter are then baked by direct contact with the heating medium, the groups of perforations in said wall of each duct being spaced apart in the longitudinal direction of the latter and the deflector plates associated with said groups of perforations in said wall of each duct being arranged in tandem and being pivotally displaceable across the flow of the heating medium by progressively increased amounts, considered in the direction of the flow of heating medium, in moving to said second positions thereof, while the last deflector plate in each duct, considered in the direction of flow of the heating medium, completely blocks said duct in said second position of said last deflector, thereby to achieve substantially uniform flow of the heating medium through the perforations into the baking chamber as between the different groups of perforations and as between the perforations in each of said groups for effecting uniform heating of the baking chamber at the successive groups of perforations when said deflector plates are in said second positions.

2. A baker's oven comprising a horizontal baking chamber through which the products to be baked are passed, a plurality of radiator ducts each receiving a flow of gaseous heating medium and having a wall defining a boundary between said baking chamber at one side of said wall and the radiator duct at the other side of said wall, each wall having groups of perforations therein which are spaced apart both longitudinally and transversely thereof, said groups of perforations, taken together, representing a substantial portion of the horizontal area of said wall, and a deflector plate for each of said groups of perforations movable between a first position, where the deflector plate closes the related group of perforations to confine the flow of gaseous heating medium to the radiator duct so that products passed through said baking chamber are baked indirectly by heat radiated from the medium, and a second position, where said deflector plate uncovers the related group of perforations to permit the flow of gaseous heating medium to pass therethrough from the radiator duct into said baking chamber so that products in the latter are then baked by direct contact with the heating medium, each of said deflector plates being disposed within the related radiator duct and including two hingedly connected parts, one of said parts being hingedly mounted on said wall of the radiator duct at the downstream side of the related group of perforations so that angular displacement of said one part effects bodily movement of the other of said parts toward and away from said wall, said other part of the deflector plate being angularly displaceable independently of said one part so that the inclination of said other part relative to said wall is independent of the distance of said other part from the wall as determined by the angular displacement of said one part.

3. A baker's oven comprising a horizontal baking chamber through which the products to be baked are passed and including side walls, a plurality of radiator ducts each receiving a flow of gaseous heating medium and having a horizontal wall defining a boundary between said baking chamber at one side of said horizontal wall and the radiator duct at the other side of said horizontal wall, each horizontal wall having groups of perforations therein which are spaced apart both longitudinally and transversely thereof and which are arranged in laterally extending rows, said groups of perforations, taken together, representing a substantial portion of the area of said horizontal wall, a deflector plate for each of said groups of perforations movable between a first position, where the deflector plate closes the related group of perforations to confine the flow of gaseous heating medium to the radiator duct so that products passed through said baking chamber are baked indirectly by heat radiated from the medium, and a second position, where said deflector plate uncovers the related group of perforations to permit the flow of gaseous heating medium to pass therethrough from the radiator duct into said baking chamber so that products in the latter are then baked by direct contact with the heating medium, and vertically disposed plates projecting into said baking chamber from said horizontal wall and extending laterally between said rows of perforations to ensure that the heating medium entering the baking chamber through said perforations, when said deflector plates are in said second positions, is directed positively onto the products passing through the baking chamber, said side walls of the baking chamber having discharge ports therein at locations between said vertically disposed plates and through which the heating medium is withdrawn from the baking chamber to reduce to a minimum the longitudinal flow of gaseous heating medium through the baking chamber.

References Cited in the file of this patent

UNITED STATES PATENTS

| | | |
|---|---|---|
| 1,502,186 | Greenwood | July 22, 1924 |
| 1,811,980 | Smith | June 30, 1931 |
| 2,256,350 | Nystrom | Sept. 16, 1941 |
| 2,337,006 | Stephens | Dec. 14, 1943 |
| 2,604,059 | Warrington | July 22, 1952 |

FOREIGN PATENTS

| | | |
|---|---|---|
| 504,950 | Great Britain | May 3, 1939 |